United States Patent [19]

Brister

[11] Patent Number: 4,671,902

[45] Date of Patent: Jun. 9, 1987

[54] PROCESS FOR OBTAINING FATTY ACID PRODUCT FROM GLYCERIDE OIL SOAPSTOCK

[75] Inventor: Bryan C. Brister, Hernando, Miss.

[73] Assignee: The Procter & Gamble Company, Cincinnati, Ohio

[21] Appl. No.: 588,844

[22] Filed: Mar. 12, 1984

[51] Int. Cl.$^4$ .......................... C11B 13/00; C11B 3/04
[52] U.S. Cl. .................................. 260/412.5; 260/424; 260/428
[58] Field of Search ....................... 260/412.5, 424, 428

[56] References Cited

U.S. PATENT DOCUMENTS

| | | | |
|---|---|---|---|
| 2,230,196 | 1/1941 | Clayton | 260/412.5 |
| 2,239,131 | 4/1941 | Thurman | 260/419 |
| 2,472,193 | 6/1949 | Clayton | 260/412.5 |
| 2,601,375 | 6/1952 | Durkee | 260/412.5 |
| 2,812,343 | 11/1957 | Cox et al. | 260/413 |
| 2,929,714 | 3/1960 | White et al. | 99/4 |
| 2,970,910 | 2/1961 | Thurman | 99/2 |
| 3,425,938 | 2/1969 | Bloomberg et al. | 210/59 |
| 3,428,660 | 2/1969 | Morren | 260/412.5 |
| 3,787,460 | 1/1974 | Gadefaix et al. | 260/418 |
| 3,974,069 | 8/1976 | Nettli | 210/45 |
| 4,100,181 | 7/1978 | Phillips et al. | 260/416 |
| 4,118,407 | 10/1978 | Red et al. | 260/412.5 |
| 4,259,251 | 3/1981 | Akers et al. | 260/412.5 |
| 4,361,517 | 11/1982 | Duff et al. | 260/412.5 |

OTHER PUBLICATIONS

*Handbook of Separation Techniques for Chemical Engineers*, McGraw Hill Inc., 1979, TP156-545 #35 C4.
*Kirk Othmer Encyclopedia of Chemical Technology*, vol. 10, John Wiley & Sons, NY, 1966, p. 4, TP9 E68.
Keith, F. W., V. G. Bell, & F. H. Smith, "Continuous Purification and Acidulation of Vegetable Oil Soapstock", *J. Am. Oil Chemists' Society*, vol. 32 (Oct., 1955), pp. 517-519.
Todd, D. B., and J. E. Morren, "Continuous Soapstock Acidulation", *J. Am. Oil Chemists' Society*, vol. 42 (Apr., 1965), pp. 172A, 178A.
Braae, B., "Degumming and Refining Practices in Europe", *J. Am. Oil Chemists' Society*, vol. 53 (Jun. 1976), pp. 353-357.
Woerfel, J. B., "Alternatives for Processing of Soapstock", *J. Am. Oil Chemists' Society*, vol. 60 (Feb., 1983), pp. 262A-265A.
Mag, T. K., D. H. Green, and A. T. Kwong, "Continuous Aciduation of Soapstock and Recovery of Acid Oil", *J. Am. Oil Chemists' Society*, vol. 60 (May, 1983).

*Primary Examiner*—Charles F. Warren
*Assistant Examiner*—Elizabeth A. Flaherty
*Attorney, Agent, or Firm*—Leonard W. Lewis; Fredrick H. Braun; Richard C. Witte

[57] ABSTRACT

The present invention provides a process for obtaining a fatty acid product from a glyceride oil soapstock. The process includes the following steps:

(a) An acidulated soapstock is formed by reacting the glyceride oil soapstock with an aqueous mineral acid solution.
(b) The acidulated soapstock is separated into an aqueous solution and a fatty material/emulsified sludge material mixture.
(c) The fatty/sludge mixture is dried to a moisture content of less than about 5%, such that the emulsion in the emulsified sludge material is substantially broken.
(d) The dried fatty/sludge mixture is separated into the fatty acid product and a solids residue.

16 Claims, No Drawings

PROCESS FOR OBTAINING FATTY ACID PRODUCT FROM GLYCERIDE OIL SOAPSTOCK

TECHNICAL FIELD

The present invention relates to processes for obtaining purified fatty acid products from glyceride oil soapstocks. Such glyceride oil soapstocks are byproducts of glyceride oil refining.

BACKGROUND OF THE INVENTION

Crude glyceride oils contain free fatty acids and other impurities. Such crude oil is refined by contacting the crude oil with aqueous alkali in a batch for continuous process. The alkali reacts with the free fatty acids to form soap. The soap and other solid impurities are separated from the oil by settling or centrifuging. The solids thus obtained are designed "soapstock" or "foots"; the soapstock is alkaline.

Fatty acids can be recovered from soapstock as a valuable byproduct of the oil refining process. A product high in fatty acid content (generally about 95% free fatty acids) is obtained from the soapstock by acidulation with a mineral acid such as sulfuric or hydrochloric acid. Soapstock is reacted with an aqueous acid solution at an elevated temperature. If the acidulated soapstock is allowed to settle, it separates into three layers. The bottom layer is an acidic aqueous solution which can be pumped off and recycled. The top layer is the desired fatty acid product which may be used as is (e.g., for animal feed), or may be further treated to obtain more highly purified fatty acids (e.g., by distillation). The middle layer is an emulsified sludge material, a semisolid, emulsified layer containing primarily gums (e.g. lecithins and other phospholipids), water, and a substantial quantity of the desired fatty acid product entrained therein.

A variety of batch and continuous processes for recovering fatty acid products from glyceride oil soapstocks are known. References disclosing such processes include the following U.S. Pat. Nos.: 2,230,196 issued to Clayton on Jan. 28, 1941; 2,239,131 issued to Thurman on Apr. 22, 1941; 2,472,193 issued to Clayton on June 7, 1949; 2,601,375 issued to Durkee on June 24, 1952; 2,812,343 issued to Cox & Brice on Nov. 5, 1957; 2,929,714 issued to Wittee & Sipos on Mar. 22, 1060; 2,970,910 issued to Thurman on Feb. 7, 1961; 3,425,938 issued to Bloomberg & Hutchins on Feb. 4, 1969; 3,428,660 issued to Morren on Feb. 18, 1969; 3,787,460 issued to Gadefaix & Klere on Jan. 22, 1974; 3,974,069 issued to Nettli on Aug. 10, 1976; 4,100,181 issued to Phillips & Leavens on July 11, 1978; 4,118,407 issued to Red & llagan on Oct. 3, 1978; and 4,361,517 issued to Duff & Segers on Nov. 30, 1982. Other references disclosing processes for continuous or batch acidulation of glyceride oil soapstocks include the following: Keith, F. W., V. G. Bell & F. H. Smith, "Continuous Purification and Acidulation of Vegetable Oil Soapstock", *J. Am. Oil Chemists' Soc.*, Vol. 32 (October, 1955), pp. 517–519; Todd, D. B., and J. E. Morren, "Continuous Soapstock Acidulation", [*J. Am. Oil Chemists' Soc.*, Vol. 42 (April, 1965), pp. 172A,178A; Braae, Ben, "Degumming & Refining Practices in Europe", *J. Am. Oil Chemists' Soc.*, Vol. 53 (June 1976), pp. 353–357; Woerfel, J. B., "Alternatives for Processing of Soapstock", *J. Am. Oil Chemists' Soc.*, Vol. 60 (February, 1983), pp. 262A–265A; and Mag, T. K., D. H. Green, & A. T. Kwong, "Continuous Acidulation of Soapstock & Recovery of Acid Oil", *J. Am. Oil Chemists' Soc.*, Vol. 60 (May, 1983).

Morren discloses a process for continuous acidulation of soapstock and separation by centrifuging. Morren indicates that the acidulation reaction causes a tenacious interfacial emulsion which can be broken by heating and the addition of water. Most of the references cited hereinabove do not mention formation of a sludge layer between the fatty and aqueous layers, and therefore do not deal with disposal of the sludge layer.

In commercial soapstock acidulation processes, the sludge material is commonly retained with the fatty material initially. The sludge material is subsequently removed from the fatty layer by settling and is often discarded, because it has been found to be uneconomical to recover the fatty acid product entrained in the sludge material.

SUMMARY OF THE INVENTION

It is an object of the present invention to provide an economical process for recovery of fatty acid product entrained in the emulsified sludge material which forms after acidulation of glyceride oil soapstock.

It is a further object of the present invention to provide a process which breaks the emulsion of such an emulsified sludge material.

A process of the present invention is used to obtain a fatty acid product from a glyceride oil soapstock. The process comprises the following steps:

(a) forming an acidulated soapstock by reacting the glyceride oil soapstock with an aqueous mineral acid solution;

(b) separating the acidulated soapstock into an aqueous solution and a fatty material/emulsified sludge material mixture;

(c) drying the fatty/sludge mixture to a moisture content of less than about 5%, such that the emulsion in the emulsified sludge material is substantially broken; and (d) separating the dried fatty/sludge mixture into the fatty acid product and a solids residue.

DETAILED DESCRIPTION OF THE INVENTION

For processes of the present invention, glyceride oil soapstock is acidulated using a mineral acid such as sulfuric acid of hydrochloric acid. In a preferred process of the present invention, glyceride oil soapstock is mixed with sulfuric acid and water. This reaction mixture is heated, preferably to a temperature of from about 80° C. to about 95° C. The reaction mixture is held at such temperature with agitation to keep the mixture well mixed, preferably for a period of at least about 2 hours. The pH of the reaction mixture is preferably controlled at a pH of from about 2 to about 4.5, more preferably at a pH of from about 3 to about 4, by the addition of concentrated mineral acid or soapstock which is alkaline.

After the acidulation reaction is completed, the resulting acidulated soapstock can be separated into phases by common separation techniques such as by centrifuging or by settling. By either process, an aqueous solution can be separated from the remaining material. If the acidulated soapstock is allowed to settle, preferably for a period of at least about 2 hours at a temperature of from about 65° C. to about 95° C., the acidulated soapstock separates into three layers: a top fatty layer, a middle emulsified sludge layer, and a bottom aqueous layer. The bottom layer is an acidic aqueous solution which is pumped off; the acid in the solution can be utilized in the next batch.

The fatty layer can be drawn off from the sludge layer; it is a fatty acid product, typically containing about 90–95% free fatty acids. The remaining emulsified sludge layer is a tenacious, semisolid emulsified material containing primarily lecithins, other phospholipids, water, free fatty acids (typically about 12%), and other minor constituents such as small particles of oil seed debris. The entrained free fatty acids cannot economically be removed from the emulsified sludge material by conventional techniques such as settling or centrifuging. (Some of the free fatty acids can be recovered by settling for very long periods of time.)

Processes of the present invention achieve recovery of most of the free fatty acids from the sludge material by retaining the fatty and sludge layers together through a drying process which substantially breaks the emulsion in the sludge material. It is preferred to retain the fatty and sludge materials together because drying the emulsified sludge material itself results in an extremely viscous material that cannot be transported by conventional pumping means. In processes of the present invention, the fatty and sludge layers are preferably retained together as a fatty/emulsified sludge mixture which is dried to a water content of less than about 5%, preferably to a water content of less than about 4%, more preferably to a water content of less than about 3.5%.

A preferred method for drying the fatty/emulsified sludge mixture employs a batch process in which the fatty/sludge mixture is circulated through a heat exchanger and heated, preferably to a temperature of from about 100° C. to about 130° C., more preferably to a temperature of from about 105° C. to about 115° C. The heated fatty/sludge mixture is sprayed into a tank where water flahses from the mixture; water vapor is removed from the tank, typically by aspirating the tank.

The fatty/sludge mixture tends to foam substantially when it is heated sufficiently to drive off water, e.g. during the drying step. When such foaming occurs in the drying process, a substantial amount of foam with entrained liquid is generally carried off with the water vapor, thus causing a substantial loss of fatty acid product. In order to prevent such loss due to foaming of the fatty/sludge mixture, a silicone antifoam agent is preferably added to the fatty/sludge mixture. The silicone antifoam agent is preferably added prior to the drying step at a level of from about 3 ppm (parts per million—free fatty acid basis) to about 200 ppm, more preferably at a level of from about 4 ppm to about 40 ppm, more preferably still at a level of from about 5 ppm to about 10 ppm.

The drying step substantially breaks the emulsion of the sludge material so that the fatty acid product can be separated from solid impurities by any conventional means, preferably by centrifuging. The dried fatty/sludge mixture is preferably retained at a temperature of from about 65° C. to about 130° C., more preferably at a temperature of from about 65° C. to about 90° C., during the preferred centrifuging step. The fatty acid product recovered by this process typically contains less than about 1% solids, and the solids residue which is discarded typically contains less than about 2% free fatty acids.

The following example is an exemplary batch process which illustrates the invention; it is not intended to be in any way limiting thereof.

EXAMPLE

The hot acidic aqueous solution (bottom layer) from a previous batch is retained in a fiberglass reaction tank having a capacity of 75,000 liters. Addition of alkaline soybean oil soapstock (containing 30% neutralized free fatty acids) and concentrated sulfuric acid (95%) to the tank is begun. During this addition of materials, the tank mixture is heated to a temperature of up to about 95° C. by the addition of live steam to the tank. A side-entry agitator having a 59 cm diameter propeller-type impeller driven by a 7½ Hp motor is used to mix the contents of the tank. The pH of the tank is monitored. Before the tank is full and at a time when the pH of the tank contents is about 7, agitation of the mixture and addition of the soapstock and sulfuric acid are ceased. The tank contents are allowed to settle for several minutes until a clear, aqueous bottom layer forms. A sufficient quantity of aqueous bottom layer is pumped off such that a total of 54,000 kg of soybean oil soapstock can be added to the tank.

The acidulation reaction is carried out in the tank for two hours while maintaining a temperature of about 90° C. by the addition of live steam to the tank when needed. The pH of the reaction mixture is controlled at 3-4 by the addition of small increments of concentrated sulfuric acid or alkaline soybean oil soapstock when needed.

After two hours of acidulation reaction time, agitation is stopped. The batch is allowed to settle for two hours during which time it separates into three layers. The bottom aqueous layer is pumped off to a second tank for use in the next batch. The remaining 28,000 kg of fatty/sludge mixture contains about 17,000 kg free fatty acids. To the fatty/sludge mixture, 120 g (7 ppm—free fatty acid basis) of a silicone antifoam agent, Dow Corning Antifoam A (available commercially from Dow Corning Corporation, Midland, Mich.) is added with agitation.

While retaining agitation in the tank, the fatty/sludge mixture is circulated by pumping through a steam heat exchanger which heats the mixture to about 110° C. The heated mixture is then sprayed back into the tank thus flashing water from the mixture. The tank is aspirated to draw off the water vapor. The fatty/sludge mixture is circulated through the heat exchanger and sprayed back into the tank until the water content of the fatty/sludge mixture is less than 3½%, and the emulsion in the sludge material is substantially broken.

The fatty/sludge mixture is maintained at about 80° C. and is pumped to a centrifuge (e.g., a Sharples P660 Decanter, Type BM-PF743481099, available commercially from Sharples-Stokes Division of the Pennwalt Corporation, Warminster, Pa.) which separates a solids residue from the desired fatty acid product. 17,000 kg of fatty acid product containing 95% free fatty acids and less than 1% solids is obtained from the centrifuging step; 3,000 kg of solids residue containing less than 2% free fatty acids is discarded.

While particular embodiments of the present invention have been illustrated and described, it will be obvious to those skilled in the art that various changes and modifications can be made without departing from the spirit and scope of the invention. It is intended to cover, in the appended claims, all such modifications that are within the scope of this invention .

What is claimed is:

1. The process of obtaining a fatty acid product from a glyceride oil soapstock, said process comprising:
   (a) forming an acidulated soapstock by reacting said glyceride oil soapstock with an aqueous mineral acid solution;
   (b) separating said acidulated soapstock into an aqueous solution and a fatty material/emulsified sludge material mixture;
   (c) drying said fatty/sludge mixture to a moisture content of less than about 5%, such that the emulsion in said emulsified sludge material is substantially broken; and
   (d) separating said dried fatty/sludge mixture into said fatty acid product and a solids residue.

2. The process of claim 1 wherein, prior to step (c), a silicone antifoam agent is added to said fatty/sludge mixture such that loss of fatty acid product due to foaming in step (c) is substantially prevented.

3. The process of claim 2 wherein, prior to step (c), from about 3 ppm to about 200 ppm (free fatty acid basis) of said silicone antifoam agent is added to said fatty/sludge mixture.

4. The process of claim 2 wherein, prior to step (c), from about 4 ppm to about 40 ppm (free fatty acid basis) of said silicone antifoam agent is added to said fatty/sludge mixture.

5. The process of claim 2 wherein, prior to step (c), from about 5 ppm to about 10 ppm (free fatty acid basis) of said silicone antifoam agent is added to said fatty/sludge mixture.

6. The process of claim 2 wherein, in step (d), said fatty acid product and said residual solids are separated by centrifuging.

7. The process of claim 4 wherein, in step (d), said fatty acid product and said residual solids are separated by centrifuging.

8. The process of claim 2 wherein, in step (c), said fatty/sludge mixture is dried by heating said mixture to a temperature of from about 100° C. to about 130° C., spraying said heated mixture into a tank, and drawing water vapor off said tank.

9. The process of claim 7 wherein, in step (c), said fatty/sludge mixture is dried by heating said mixture to a temperature of from about 100° C. to about 130° C., spraying said heated mixture into a tank, and drawing water vapor off said tank.

10. The process of claim 1 wherein, in step (c), said fatty/sludge mixture is dried to a moisture content of less than about 3.5%.

11. The process of claim 6 wherein, in step (c), said fatty/sludge mixture is dried to a moisture content of less than about 3.5%.

12. The process of claim 8 wherein, in step (c), said fatty/sludge mixture is dried to a moisture content of less than about 3.5%.

13. The process of claim 9 wherein, in step (c), said fatty/sludge mixture is dried to a moisture content of less than about 3.5%.

14. The process of claim 13 wherein, in step (d), said fatty/sludge mixture is centrifuged at a temperature of from about 65° C. to about 120° C.

15. The process of claim 14 wherein, in step (a), said mineral acid is sulfuric acid.

16. The process of claim 15 wherein said glyceride oil soapstock is soybean oil soapstock; and wherein, in step (a), said reaction is carried out at a pH of from about 3 to about 4 and at a temperature of from about 80° C. to about 95° C. for a period of at least about 2 hr.

* * * * *